R. S MERRILL.
Picture Hook.
No. 201,695. Patented March 26, 1878.
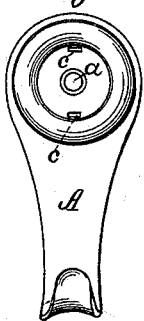
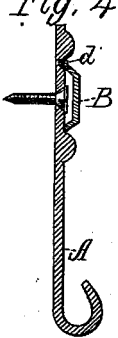
Witnesses:
Rufus S. Merrill
Inventor:
by his attorney

UNITED STATES PATENT OFFICE.

RUFUS S. MERRILL, OF BOSTON, MASSACHUSETTS.

IMPROVEMENT IN PICTURE-HOOKS.

Specification forming part of Letters Patent No. 201,695, dated March 26, 1878; application filed March 8, 1878.

*To all whom it may concern:*

Be it known that I, RUFUS S. MERRILL, of Boston, Massachusetts, have invented a certain new and Improved Picture-Hook, of which the following is a specification:

The hook that I have devised is made of wrought or cast metal, formed of a single piece of metal, which is turned up at the lower end in hook form, and has its body or shank formed so as to lie flat or close against the wall to which the hook is to be secured. In the upper end of the hook is formed a hole, through which passes the nail or screw that secures the hook in place. I provide for the hook a cover or cap, which fits over the nail or screw hole, and is movable to uncover the same whenever it is desired to insert or withdraw the nail or screw.

In the accompanying drawings, Figure is a front elevation of a hook made in accordance with my invention, the cap being removed to expose the nail or screw hole. Fig. 2 is a transverse vertical section of the hook with the cap and screw in place. Fig. 3 is a view of the cap detached.

The hook A is made of wrought or cast metal, in one piece, and, as shown, is composed of a plate or strip turned up at its lower end to form the hook proper, while its shank is so formed as to be flat or close against the wall to which the hook is to be secured.

At the end opposite to the hook proper there is formed in the shank the hole $a$, through which passes the nail or screw by which the device is held to the wall.

B is a cover or cap of any preferred pattern, which fits on the hook over the hole $a$, and is provided with tongues or projections $b$, that enter or snap into slots $c$ in the hook, and thus hold the cap or cover in place.

With such a hook as described a common nail or screw can be used to hold the hook in place, the head of such nail or screw being perfectly concealed by the cap or cover B, which is fitted to the hook after the nail or screw has been driven home.

It is manifest that the cap B may be connected with the hook in various other ways, which will permit it to be lifted so as to uncover the hole $a$. For instance, the cap can be hinged to the hook B very simply and inexpensively, as shown in Fig. 4, which represents a transverse vertical central section of a hook having the cap B hinged to it at the point $d$.

In conclusion, I would state that I am aware that removable caps have been used to cover the heads of nails and screws, and that hooks have been made with holes to receive nails or screws. I claim none of these things.

What I do claim, and desire to secure by Letters Patent, is—

The described picture-hook, consisting of a plate or strip of wrought or cast metal, turned up at one end to form the hook proper, and having formed in its opposite end a nail or screw hole, provided with a movable cap or cover, substantially as set forth.

In testimony that I claim the foregoing as my own I hereunto affix my signature in presence of two witnesses.

RUFUS S. MERRILL.

Witnesses:
HENRY R. ELLIOTT,
M. BAILEY.